July 21, 1931. P. A. HOLM 1,815,713
GASOLINE MEASURE
Filed June 25, 1928
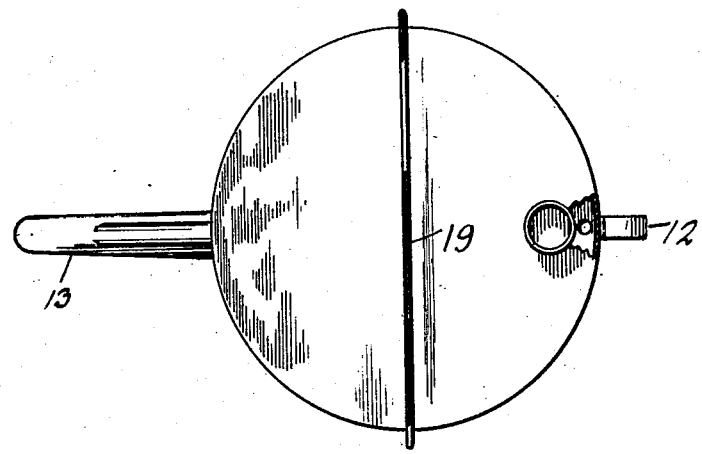
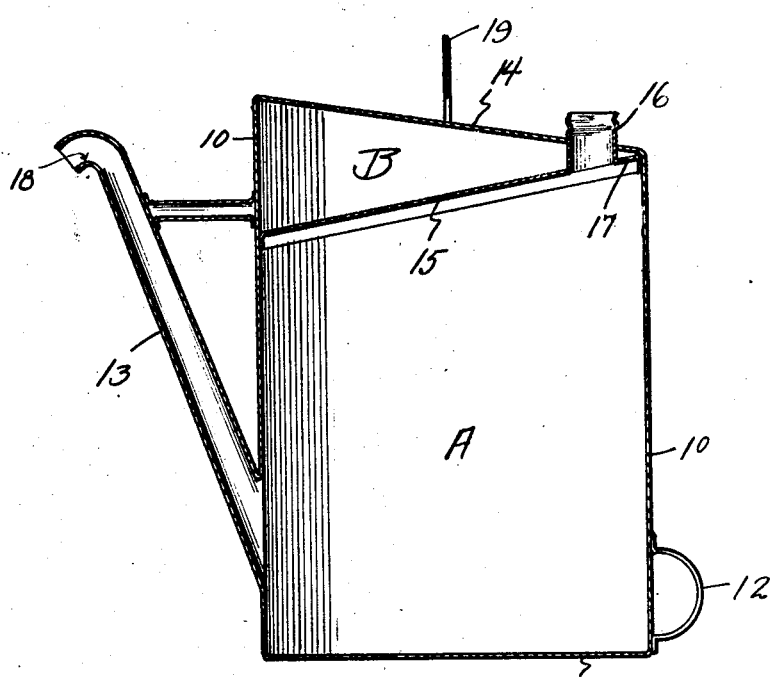
Inventor
Peter A. Holm
By Lynn H. Latta
Attorney Patented July 21, 1931

1,815,713

UNITED STATES PATENT OFFICE

PETER A. HOLM, OF SIOUX CITY, IOWA

GASOLINE MEASURE

Application filed June 25, 1928. Serial No. 287,925.

My invention relates to gasoline measures and has for its object to provide a gasoline container which is adapted to automatically measure an exact quantity of fluid.

More particularly, it is my object to provide a measure of the type embodying a closed container, a filling nozzle and a discharge spout.

A further object of my invention is to provide such a measure which is of simple, durable and inexpensive construction.

My invention embodies an overflow compartment, positioned above the body of the container of the measure and an overflow opening communicating between said compartment and the container in such a way that when the correct amount of fluid has been poured in the container, all excess will flow into the overflow compartment, the level within the container remaining the same.

A further object is to provide a measure in which a maximum capacity of the body of the container is combined with a minimum size for the entire measure.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Fig. 1 is a plan view of the measure, and

Fig. 2 is a vertical, central, sectional view of the same.

One of the problems which is faced by the ordinary filling station keeper is that of the loss of gasoline through overmeasure. This is due to the fact that the ordinary measure, if filled to the top of the filling nozzle, will contain more than the amount of liquid that it is intended to measure. It is very difficult to determine the exact height to which the measure should be filled in order to obtain the proper measure.

My invention provides a measure embodying the ordinary container body having the cylindrical side wall 10, the bottom 11, the tilting handle 12 and the discharge spout 13. The main container which is thus formed is indicated in the drawings by the reference character A.

I provide an overflow compartment B, which is positioned above the container A and which is formed between the top wall 14 of the measure and an intermediate wall 15, which is secured to the wall 10 below the upper wall 14.

The intermediate wall 15 is inclined forwardly and downwardly toward the spout 13 and the top wall 14 is inclined forwardly and upwardly. Thus the compartment B is made wedge shaped with its largest region at the forward extremity of the measure and its apex at the rear extremity thereof.

The filling nozzle 16 is secured to the intermediate wall 15, communicates with the main container A and extends through the top wall 14. The top wall serves to brace the filling nozzle and a lighter construction may therefore be employed.

An overflow opening 17 is formed in the uppermost part of the intermediate wall 15 and serves to connect the chambers A and B. The opening 17 is a little lower than the point 18 of the spout 13, in order that as the measure is filled, gasoline will run into the overflow chamber before flowing from the spout.

The operation of the device is as follows: The container A is filled in the usual manner by pouring through a funnel into the filling nozzle 16 and the operator watches the fluid so that when it appears to be at the level of the lower extremity of the nozzle 16, he can decrease the flow of liquid into the chamber A until the further addition of fluid fails to raise the level of the fluid within the filling nozzle. He will then know that the fluid is flowing through the opening 17 into the overflow chamber and will cease pouring.

He then grasps the measure in the usual manner, one hand on the bail 19 and the other hand grasping the handle 12 and tips the measure in the usual manner toward the spout 13. Fluid within the chamber B will flow to the large end of the chamber and the fluid within the chamber A will flow to the spout 13.

Should the excess fluid have been sufficient to almost fill the chamber B to the level of the opening 17, there will still be very little likelihood of any of the fluid being splashed back into the opening 17, due to the fact that the space between the upper wall 14 and the level of the opening 17 creates a reserve space into which the fluid may flow, thus lowering its level from the opening 17 as the measure is tipped forwardly.

This is an important feature when it is considered that the measure will be ordinarily used in a rather careless manner.

When the container A has been entirely emptied, the measure is tipped rearwardly to a sufficient extent to allow the fluid remaining within the chamber B to flow back through the opening 17 into the container A. For this purpose, the wedge shaped chamber B, provided with the opening 17, positioned at the apex of its wedge, acts as a funnel so that all of the fluid will be drained back into the chamber A in any position of the measure in which the normal inclination of the wall 15 to the horizontal has been reversed.

It will be understood that the opening 17 is of sufficient diameter that air may escape from the chamber B simultaneously with the flowing from the chamber of a fluid usually measured in the measure, such as gasoline or lubricating oil.

A further advantage of arranging the parts so that the opening 17 is next to the wall 10 at the upper extremity of the inclined wall 15 lies in the fact that when the overflow point has been reached, the container A will be completely full, thus utilizing all of its available space for the measuring of gasoline.

Another advantage in simplicity of construction lies in the fact that both chambers A and B are formed by the single cylindrical wall 10, the only additional element required over the usual measure being the intermediate wall 15. The simplicity of construction is thought to be apparent from the foregoing description and a measure constructed according to my invention will cost very little more than those already in use today.

Some changes may be made in the construction and arrangement of the parts of my invention without departing from the real spirit and purpose of my invention, and it is my intention to cover by my claim, any modified forms of structure or use of mechanical equivalents, which may be reasonably included within their scope.

I claim as my invention:

A gasoline measure comprising a side wall, a spout communicating therewith, a bottom and an intermediate wall secured to said side wall to form a main container, the intermediate wall being spaced from the upper edge of the side wall and inclined downwardly toward the spout, an upper wall closing the space above the intermediate wall and inclined upwardly toward the spout to form, together with the side wall and intermediate wall, an overflow chamber, the intermediate wall being provided with an opening near its highest extremity forming a communicating passage between the container and overflow chamber, and a filling nozzle secured to the intermediate wall and extending through the upper wall.

Signed this 22 day of June, 1928, in the county of Woodbury and State of Iowa.

PETER A. HOLM.